W. PAINTER.
Seed Sower.
No. 104,992.
Patented July 5, 1870.
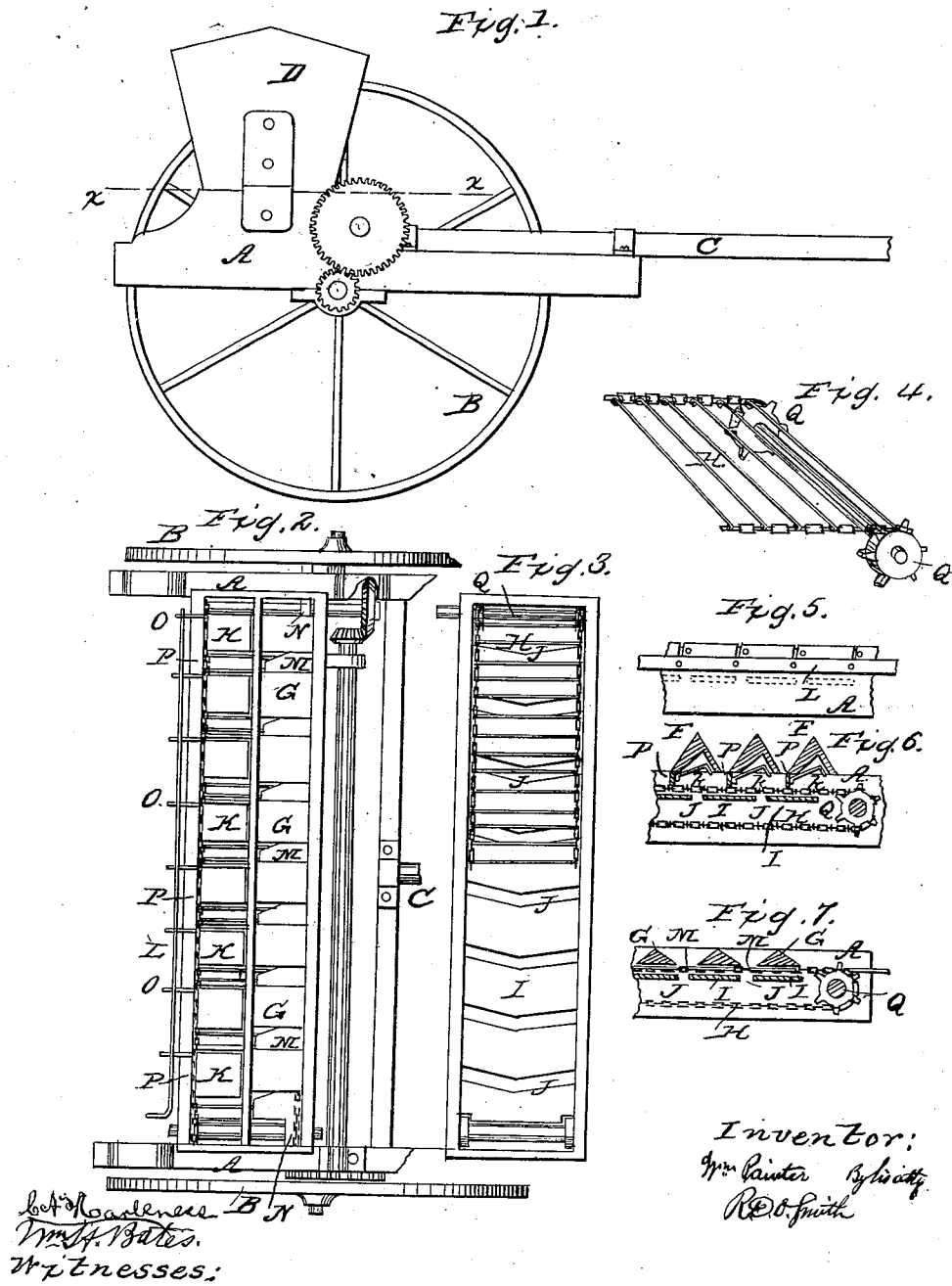

United States Patent Office.

WILLIAM PAINTER, OF BALTIMORE, MARYLAND.

Letters Patent No. 104,992, dated July 5, 1870; antedated June 23, 1870.

IMPROVEMENT IN SEED-SOWER.

The Schedule referred to in these Letters Patent and making part of the same.

*To all whom it may concern:*

Be it known that I, WILLIAM PAINTER, of Baltimore, in the county of Baltimore and State of Maryland, have invented a new and useful Improvement in Machines for Sowing Seeds and Fertilizers; and I do hereby declare the following to be a full, clear, and exact description of the same, reference being had to the accompanying drawing, in which—

Figure 1 is an end elevation of my machine, the near wheel being removed.

Figure 2 is a plan taken on line x x.

Figure 3 is a bottom plan.

Figure 4 is a perspective of the agitator or conveyer.

Figure 5, rear elevation, showing the connecting-rod by which the gates are regulated.

Figure 6 is a longitudinal section, showing the arrangement of the gates on the fertilizer side.

Figure 7 is a longitudinal section, showing the slide-valves, &c., on the seed side.

My invention relates particularly to the devices by means of which the agitation and distribution of the fertilizers or seeds through orifices in the bottom of the hopper are secured; and It consists—

First, in an endless chain agitator or conveyer.

Second, in the form and location of the discharge-orifices.

Third, in the gates which regulate the quantity of fertilizer or other material conveyed to the discharge.

Fourth, in the slides by which the quantity of grain or seed submitted to the action of the chain conveyer is regulated.

That others may fully understand my invention, I will particularly describe it.

The frame A is mounted upon suitable wheels, B B, and has a tongue or draft-pole, C, attached to its forward end, for the attachment of the team.

Upon the frame A is mounted the hopper-box D, which, for general use and convenience, is divided longitudinally by a partition, E, through its middle. This is for convenience in sowing or distributing grain or fertilizers at the same operation.

The driver has his seat upon the top of the hopper D.

The bottom of each division of the hopper is divided into a number of cells, by roof-shaped hoods or partitions, F G, placed across the bottom of each hopper, so that the material to be distributed will be prevented from moving in any direction except downward toward the agitator or conveyer.

Below the hoods is located the endless-chain carrier or agitator H, which, during the operation of the machine, moves constantly in one direction under said hoods, carrying the contents of the hopper to the discharge-holes, which are concealed beneath the hoods; and below the chain H is the bottom I, divided crosswise by tapering slots J, which form the discharge-orifices.

Beneath the hoods F in the fertilizer-hopper are located the gates K, which, by means of a series of cranks and a connecting-rod, L, are capable of being simultaneously raised or lowered, so as to regulate or entirely cut off the supply of fertilizer discharged by the conveyer, and beneath the hoods G, on the grain side, is a series of slides or valves, M, simultaneously operated by a connecting-rod, N, for the purpose of regulating or cutting off the flow of grain through the discharge-holes of that side of the machine.

The gates K are formed by plates of metal, the edges being turned up to form flanges, as shown, and each gate is secured to a pivot-rod, which is provided with bearings in the frame of the hopper, and has a crank, o, at one end, which projects beyond the frame and is coupled with the connecting-rod L, so that, as said rod is moved in one direction or the other, the gates K are elevated or depressed, and, being so located that the edges or flanges of said gates will fall upon the chain when the gates are depressed, it follows that the supply of material to be discharged will be effectually controlled.

Immediately back of each gate K is a permanent division or partition, P, the lower edge of which descends so low as to act as a scraper upon the chain H, and prevent it from conveying any of the fertilizer beyond the proper orifice of deposit.

The scrapers P are made yielding, however, so as to permit the passage of any unyielding foreign substance which may chance to be with the fertilizer. Owing to the varying characters of the different fertilizers employed, some being dry and others adhesive or wet, it becomes necessary to employ a device for its discharge which shall be capable of dealing with the different qualities of it, and such a device is found in an endless chain, which constantly moves in the same direction, and conveys the material to be discharged. This chain I find it convenient to construct as follows:

Two stout wire chains are connected by rods of iron, H, or other material may answer sometimes, said rods being equal in length to the width of the bottom of the hopper. The chains are then passed over a sprocket-wheel, Q, at one end, and a suitable roller at the other end of the hopper, said sprocket-wheel being actuated by suitable gearing connecting with one or both of the bearing-wheels B of the machine.

For the purpose of distributing grain, a less complicated system of gates is sufficient, because the grains are always regular and defined, and move easily upon each other. For this purpose, then, a series of flat slides will suffice, the same being attached to a connecting rod or bar, so that the whole may be simultaneously operated.

It has been said that the discharge orifice consisted of tapering slots in the bottom of the hopper. These slots are made tapering, so that, as each bar of the chain approaches it, the discharge may commence at one end of the slot, and continuously proceed to the other end, and thus the discharge, instead of occurring in bunches, will be continuous and evenly distributed.

The front edges of the gates M are made oblique to the rod N, for the purpose of gradually diminishing the escape of seed or grain to the conveyer without impeding the freedom of its flow through the remaining opening.

It appears evident that the position of the chain H may be changed, so that it will move in the line of the machine's progression, instead of at right angles thereto, as represented, without in any way changing the character of the apparatus or the result obtained.

I therefore desire to be understood as including that arrangement as a part of my invention.

Having now described my invention,

What I claim as new is—

1. An endless-chain agitator and conveyer, substantially as described, and for the purposes set forth.

2. In combination with an endless-chain conveyer, substantially as described, the hoods F, and gates K, or their equivalents.

3. In combination with an endless-chain agitator or conveyer, the oblique-tapering discharge-holes J.

4. In combination with an endless-chain agitator and oblique-tapering discharge-holes, the oblique-edged slide-valves M attached to a connecting rod L, common to them all, substantially as described.

W. PAINTER.

Witnesses:
    JAMES H. MURRILL,
    R. D. O. SMITH.